Jan. 2, 1940.    T. P. SIMPSON ET AL    2,185,929
METHOD OF CONDUCTING REACTIONS IN THE PRESENCE OF A CONTACT MASS
Filed Sept. 1, 1937    4 Sheets-Sheet 1

Inventors
Thomas P. Simpson,
John W. Payne,
John A. Crowley, Jr. &
Clark S. Teitsworth
By Dallas R. Lamont
Myron J. Brubhard Attorneys Jan. 2, 1940.   T. P. SIMPSON ET AL   2,185,929
METHOD OF CONDUCTING REACTIONS IN THE PRESENCE OF A CONTACT MASS
Filed Sept. 1, 1937   4 Sheets-Sheet 2

Inventors
Thomas P. Simpson,
John W. Payne
John A. Crowley, Jr. &
Clark S. Teitsworth
By Dallas R. Lamont
Myron J. Burkhard Attorneys Jan. 2, 1940.   T. P. SIMPSON ET AL   2,185,929
METHOD OF CONDUCTING REACTIONS IN THE PRESENCE OF A CONTACT MASS
Filed Sept. 1, 1937   4 Sheets-Sheet 3

Inventors
Thomas P. Simpson,
John W. Payne,
John A. Crowley, Jr. &
Clark S. Teitsworth Jan. 2, 1940. T. P. SIMPSON ET AL 2,185,929
METHOD OF CONDUCTING REACTIONS IN THE PRESENCE OF A CONTACT MASS
Filed Sept. 1, 1937 4 Sheets-Sheet 4

Inventors
Thomas P. Simpson,
John W. Payne
John A. Crowley, Jr. &
Clark S. Teitsworth Patented Jan. 2, 1940

2,185,929

UNITED STATES PATENT OFFICE 2,185,929

METHOD OF CONDUCTING REACTIONS IN THE PRESENCE OF A CONTACT MASS

Thomas P. Simpson, John W. Payne, and John A. Crowley, Jr., Woodbury, and Clark S. Teitsworth, Plainfield, N. J., assignors to Socony-Vacuum Oil Company, Incorporated, New York, N. Y., a corporation of New York Application September 1, 1937, Serial No. 162,069

8 Claims. (Cl. 23—1)

This invention is directed to a method of conducting catalytic reactions, or other operations involving the use of a mass of contact material, of the type wherein a fluid, for example a reaction mixture, flows through a contact mass, such as a bed of granular material which may for example be a catalyst, a support for a catalyst, or the like. This invention is directed to such reactions, and is equally applicable to exothermic and endothermic reactions, and also regeneration of such contact masses in situ, wherein the regeneration is also a reaction of an exothermic or endothermic nature.

Many such catalytic reactions have heretofore been conducted either by passing the reaction mixture in longitudinal flow through a deep bed of catalyst or contact mass, or by presenting the catalyst to the flowing reaction mixture in the form of a wide area of comparatively little depth, through which the reaction mixture passes in the direction of the depth. In the first case, the reactants are frequently merely passed in more or less broadcast manner through a relatively large body of contact material, and considerable difficulties are had with channeling, short circuiting, and the like, whereby some portions of the catalyst volume are never reached by a proper amount of reaction mixture and others are consistently reached by too much reaction mixture, resulting in erratic and improper treatment. Also, localized reactions cause localized deposits of reaction products, and during regeneration of the catalyst, cause localized regeneration, which is unsatisfactory. Some of these objections are remedied by placing the catalyst in separate tubes, but in many cases this leads to other objections which it is an object of this invention to avoid. Among these objections are general deficiencies and limitations in control of operating conditions and the like. In the second case mentioned above; i. e., where the reaction mixture is passed through a shallow catalyst bed of large cross-section, the difficulties resulting from channeling, over use of a portion of the catalyst, and the like, are again encountered.

A particular difficulty in contact mass operations of the kind referred to herein lies in the proper and effective distribution of heat during reactions. Catalytic reactions of exothermic or endothermic nature must have heat removed or supplied in accordance with their demands, or fail of their purpose. With an exothermic reaction, localized overheating leads to increased localized reaction, resulting in side reactions, undesirable products, sometimes dangerously accelerated reactions, and sometimes destruction of the contact material. With an endothermic reaction, localized reaction creates localized heat demand, which, due to the low conductivity of catalyst masses, cannot usually be supplied, resulting in spotty operation, frequently leading to failure of catalytic operation as a whole. It is an object of this invention to provide a method of catalytic reaction, and in general a method of conducting reactions in the presence of a contact mass, which avoids the above stated objections, is capable of high throughput per unit of catalyst mass, is capable of high yields per unit throughput per unit mass, is characterized by uniform reaction throughout a large catalytic body, is capable of uniform and delicate control, is capable of heat supply and heat extraction from and to outside agencies, and provides for heat distribution among different portions of the catalyst mass in response to the demands of the reaction system.

This invention provides a method for conducting catalytic or contact operations, including regeneration of contact material in situ, by means of which conditions throughout the contact mass can be closely controlled to attain best operation. Proper flow of reactants through the contact mass is effected, so that all portions of the fluid traversing the mass receive substantially identical treatment, thus promoting uniformity of reaction and uniformity of quality in the reaction product. This is accomplished by providing a plurality of long unit paths of flow relatively thin in at least one transverse dimension through the contact mass wherein the variation in length of paths travelled by different portions of the fluid flowing through the mass is small. Also, provision may be made for by-passing virtually any desired section of each unit path so that, in case the path becomes blocked at some point, as for instance by accumulated fines, unburned carbon, or the like, instead of the entire path becoming useless or impaired, the particular point in the path which is blocked is by-passed and substantially full use of the contact mass throughout the remainder of the path is secured. Various embodiments accomplishing this are illustrated in the drawings and described herein. This subject matter as well as the broad concept disclosed in this and our other applications noted above is claimed in our copending application Serial No. 308,058, filed December 7, 1939. The apparatus herein disclosed forms the subject matter of our copending application Serial No. 162,068, filed September 1, 1937.

Effective temperature control throughout the contact mass is accomplished. Heat transfer elements are associated with the respective catalyst paths, and every part of the contact mass lies sufficiently close to a heat transfer element to insure notable uniformity of temperature throughout the entire contact mass. Heat can be put into the contact mass or removed from it as desired. Heat distribution between different portions of the catalyst mass is effected. The means for effecting this transfer of heat and control of temperature involves positive circulation of heat transfer medium at relatively high velocity through the heat transfer elements. A high boiling point liquid having a relatively high unit volume heat absorption capacity per degree temperature change is preferred, although fluid media such as vapors, steam, gases, air, and the like, may be used. Means for heating or cooling the circulating heat transfer medium are provided.

A small volume of heat transfer medium relative to volume of contact mass is used. This conserves size and cost of apparatus, with a high proportion of total apparatus volume occupied by contact mass. It gives flexibility to the operation of the apparatus, because the entire volume of heat transfer medium in the apparatus is renewed at short intervals by the recirculation, with corresponding quick response of the apparatus to the temperature control effected by adding heat to or abstracting heat from the recirculating body of heat transfer medium. This is important in practically all operations and particularly in operations where reactions are conducted in sequence at different temperature levels, where temperature must be built up to initiate a reaction, and the like. A large area of heat transfer surface in contact with the catalyst mass relative to volume of heat transfer medium in the apparatus is used. This is important in making possible the use of a small volume of heat exchange medium with its attendant flexibility of operation just mentioned. These features result in advantages in design, construction and cost of apparatus; e. g., fewer heat transfer fluid passages are required, wider spacing of these elements is possible, stronger headers are made possible thereby, or thinner but equally strong headers. A high ratio of heat transfer surface to volume of contact is used, this being important in effecting adequate temperature control throughout the entire contact mass. In some instances, the extended heat transfer surface is utilized also to define the flow paths through the contact mass.

The foregoing novel features are important in practical operation. The optimum and limiting values of the ratios; etc., mentioned above are important to the invention and have now been reasonably well determined and are set forth in detail below. The above-described requirements for best operation have been verified by actual trial and experimentation. Adherence to the novel principles and limits set forth herein result in advantages of extreme importance and, conversely, departure therefrom results in serious disadvantages. For example, in many operations, the regeneration of the contact mass is an oxidation reaction, and if properly controlled as herein described, the operation can ordinarily be conducted with two catalyst cases built in accordance with the principles and data given herein, one case being in regeneration while the other is on production. Substantial departure from the principles stated herein, for example departure from the stated ratios, results in slowing down regeneration and increasing length of cycle to the point where regeneration cannot be effected during the useful production time of one catalyst case, thereby requiring three cases instead of two. Furthermore, such departure from the requirements of this invention results in wider temperature variations within the body of the contact mass, less uniformity of reaction and regeneration, and lower yield per unit volume of contact mass and per unit volume of material charged. If it is attempted to force the operation to offset some of these disadvantages, other serious objections are encountered including destruction of the catalyst because of excessively intense burning at localized points.

The manner of conducting reactions herein described shows outstanding advantages over operations heretofore used for similar purposes.

To completely understand the apparatus which embodies our invention and the process to be practised therein, reference is now made to the drawings attached to this specification. In these drawings, Figure 1 shows a longitudinal sectional view of one form of the apparatus, Figure 2 shows a cross-section of that form, and Figures 3, 4, 5, and 6 set forth certain optional arrangements which may be used therein.

Figures 1, 2, 3, 4:
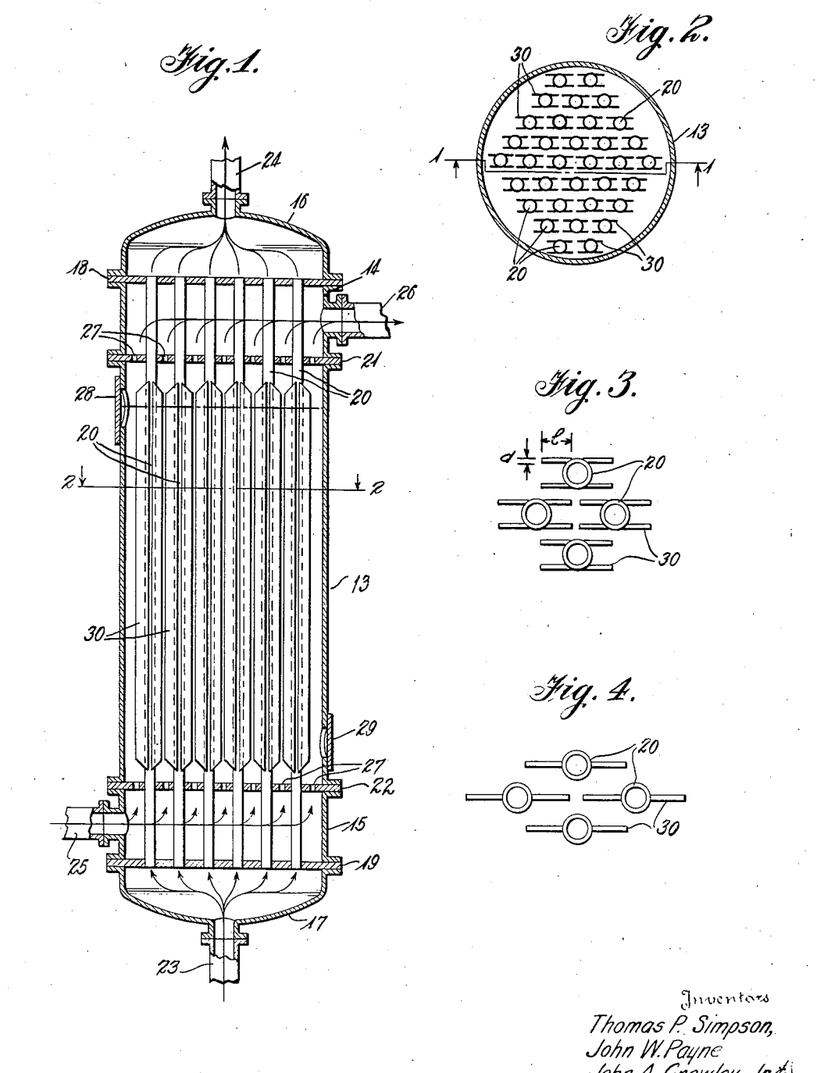

Referring now to Figures 1 to 6, inclusive, Figure 1 shows a longitudinal section in somewhat diagrammatic form of an apparatus embodying the essential features necessary for the practise of our invention. The apparatus of Figure 1 consists of a shell 13 lying between body members 14 and 15, and completed at either end by end pieces 16 and 17. Tube plate 18 is placed between members 14 and 16, and tube plate 19 is placed between members 15 and 17. Tubes 20 extend between tube sheets 18 and 19 and are securely fastened into the respective tube sheets by rolling, welding, or other form of fastening appropriate. Orifice plate 21 is placed between parts 13 and 14 and the tubes 20 pass through plate 21 without being affixed thereinto. Orifice plate 22, similarly, is placed between members 13 and 15, and tubes 20 similarly pass through orifice plate 22. The end member 17 is equipped with an inlet fitting 23 and end member 16 is equipped with an outlet fitting 24. Inlet member 25 communicates with the space inside of member 15 between plates 19 and 22, surrounding tubes 20. Outlet member 26 communicates with the space within member 14 between plates 18 and 21, and around tubes 20. Orifice plates 21 and 22 are equipped with orifices 27, distributed uniformly over that portion of their area not occupied by passages for tubes 20. A fluid reaction material entering through inlet 25 will pass through the orifices 27 in plate 22, longitudinally through the space within the shell 13, through the orifices 27 in plate 21, and leave the system through fitting 26. A second fluid may enter through 23, pass through tubes 20 and leave the apparatus through fitting 24 without coming in physical contact with the first-named fluid. Tubes 20 being constructed of heat conductive material, the two fluids are in heat exchange relationship. The direction of flow of either fluid may be changed without altering this relationship. The shell 13 serves as the container for a catalytic or contact mass preferably composed of granular particles. This contact mass may be introduced and removed by making use of the openings normally covered by plates 28 and 29.

The design and arrangement of the tubes 20 within the shell 13 is such that these tubes 20 also serve to divide the catalyst bed maintained in shell 13 into a larger number of longitudinal passages, whose greatest length is parallel to the direction of reaction mixture flow through the shell. To assist in this division and, of greater importance, to augment the ratio between external surface and internal surface of the heat exchanger tubes 20, fins 30 are placed upon the external surface of the heat exchanger tubes. To properly subdivide the contact mass into suitable longitudinal passages, the tubes and fins preferably should be arranged so as to permit the least resistance to longitudinal flow and at the same time to furnish a maximum resistance to lateral flow, although in this form it is preferred that no unit path or passage be completely isolated from contact with other passages for reasons stated above. The arrangement is preferably such as to give a substantially uniform cross-sectional area of catalyst throughout the length of each passage and of the catalyst case, which of itself promotes longitudinal flow under uniform conditions.

Figure 5:
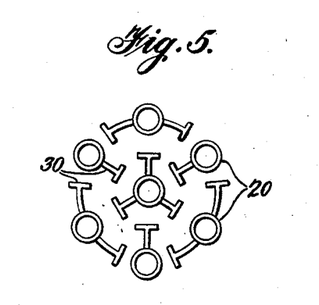
Figure 6:
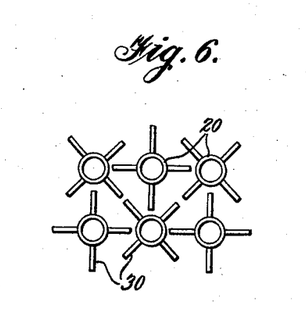

Figure 2 shows a cross-section of the catalyst-containing portion of the apparatus of Figure 1 and sets forth a convenient and economical arrangement of tubes and fins to accomplish these purposes, which arrangement is shown in more detail in Figure 3. Figures 4, 5, and 6 show other optional arrangements of finned tubes. In these figures the set-up is designed for the circulation of heat exchange medium inside the tubes, the contact mass being outside.

Figure 7:
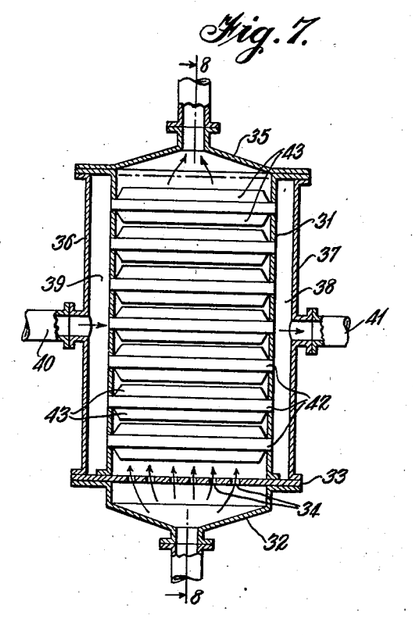
Figures 7 and 8 show longitudinal sections in planes 90° apart of another form of apparatus embodying the same general characteristics.
Figure 8:
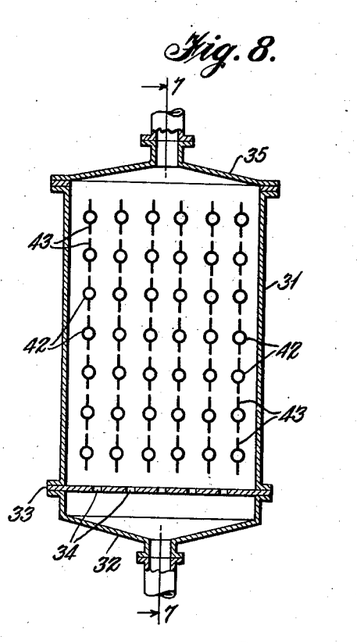

It is also possible to preserve the longitudinal positioning of the passages within the catalyst mass while making use of heat exchange tubes positioned transversely thereto. In Figures 7 and 8 two views are shown of a design in which this is accomplished. This apparatus consists of a catalyst casing 31, mounted above a reaction mixture inlet housing 32, which is divided from the catalyst space by distributor plate 33 in which there are orifices 34. Above the catalyst chamber is reaction mixture exit housing 35. On two sides of the catalyst casing 31, auxiliary plates 36 and 37 define spaces 38 and 39, which act as inlet and outlet chambers for heat exchange medium which may enter by 40, and leave by 41, or the reverse, and which is conducted through the catalyst bed by a series of tubes 42 extending from side to side of the catalyst case. These tubes are arranged in vertical rows and are preferably equipped with fins 43, the tubes and fins being arranged so as to subdivide the catalyst mass into a number of longitudinally extending paths of relatively great length in proportion to cross-section, as shown. This object may also be approximated by using smaller vertical spacing of unfinned tubes, while maintaining the same horizontal spacing.

Attention is called to the restricted intercommunication of contact mass conduits along their length, as shown in previous figures. This constitutes one feature of this invention. In Figures 1 to 8, inclusive, this restricted intercommunication is shown by the interstices between the fins. For any given zone along the flow path through the catalyst mass, which zone may be considered as being relatively thin and at substantially uniform static pressure under normal conditions of flow, the free area for flow between conduits in a transverse direction is relatively small compared with the free area in a direction longitudinal to the flow of reaction material. Normal flow is largely longitudinal of the respective conduits, but substantial flow between conduits to compensate for abnormal conditions is possible.

Figure 9:
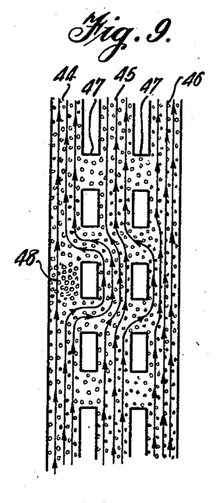
Figure 9 is a diagram explaining one feature of the invention.

To understand how uniform distribution of flow may be accomplished, reference is made to Figure 9 of the drawings, in which there is shown in diagrammatic form three passages, 44, 45, and 46, each packed with contact mass and between which there is restricted communication at intervals along their length by cross passages 47. In passage 44 there is a stoppage 48, indicated by a denser packing of the contact mass. Equal amounts of reaction mixture, as indicated by the flow lines, are introduced at the bottom of the several paths. Only a portion of that normally flowing in path 44 can pass through the stoppage 48. As indicated by the flow lines, the remainder will pass through some horizontal intercommunication 47 below the stoppage, be distributed among the other paths and again through some other horizontal passage 47 above the stoppage it will return to passage 44, so that in this manner there is maintained throughout the case a substantially uniform distribution of flowing reaction material among the several paths and along their length by virtue of their restricted lateral intercommunication.

Figure 10:
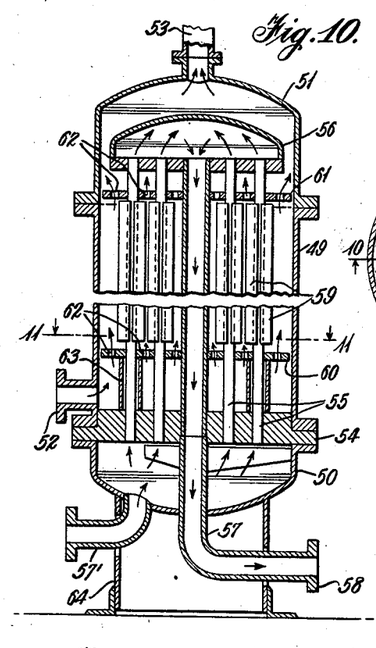
Figure 10 is a sketch showing a longitudinal section of a form of apparatus embodying the same essentials and well adapted for commercial practise of the invention.

Figure 10 of the drawings shows a form of reaction case which not only admirably embodies the essential features of our invention, but which is considerably more adaptable for the commercial practise of the invention than the form shown in Figure 1, in that it is able to successfully withstand the strains and distortion set up by differential expansion of the several parts of the apparatus upon heating and cooling. The apparatus shown in longitudinal section in Figure 10 is enabled to handle these stresses by means of an internal floating head arrangement. The apparatus of Figure 10 consists of a shell 49, to which are attached end sections 50 and 51. Reaction mixture is admitted to the shell space 49 by inlet fitting 52 and reaction products are withdrawn by outlet fitting 53 in end member 51. Between shell 49 and end member 50, there is placed a heavy tube sheet 54 in which are rolled tubes 55. These tubes 55 at their upper end are secured in the tube sheet member of floating head 56. A large central tube 57 is also secured between tube sheet 54 and the floating head 56. Heat exchange medium is introduced by inlet fitting 57', led to the space within end fitting 50, through tubes 55 into floating head 56, thence into central tube 57 and out through outlet 58. The tubes 55 are equipped with fins 59 as before. Catalyst is confined between support plate 60 and plate 61, both of which have orifices 62 for the passage of reaction mixture therethrough. To support plate 60 some distance above tube sheet 54 and thus provide a plenum chamber for the introduction of reaction material, there are used short lengths of pipe 63 surrounding tubes 55, resting on tube sheet 54 and supporting orifice plate 60. The fins 59 on tubes 55 extend between plates 60 and 61, and plate 61 conveniently may be supported upon the upper ends of these fins if it be so desired. This apparatus is arranged to be installed in vertical position and may be supported conveniently by the skirt 64 as shown. It is preferably arranged as shown for assembly by means of bolted flanges and may be charged with catalyst before placing end piece 51 in final position and discharged of catalyst, at the infrequent intervals necessary, by lifting shell 49 free from tube plate 54 until the catalyst may be removed from above plate 60. It is obvious that in this design the direction of passage of either reaction material or heat exchange medium may be reversed from that indicated while preserving the essential features of operation shown. It will be seen that in this design convenient provision for the handling of differential heat expansion and the like has been made and a design convenient and economical of fabrication has been attained.

Figure 11:
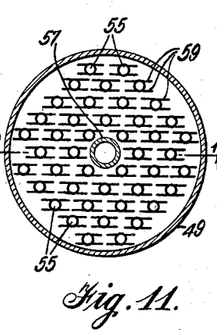
Figure 11 is a cross-section of the apparatus shown in Figure 10.

Figure 11 shows a horizontal cross-section of Figure 10, taken at a point between the ends of the catalyst-containing space.

It may be seen that these various forms of apparatus all embody one general characteristic. They permit the use of catalyst masses which are relatively deep in proportion to their cross-sectional area and are in heat exchange relationship throughout their length with a heat exchange medium by which their temperature may be closely controlled while in operation. Each design accomplishes this by arranging in one form or another, a series of conduits extending longitudinally of the direction of reaction material flow, which conduits are filled with a catalyst mass and then surrounding and/or defining these with other conduits through which flows a heat exchange medium.

As stated above, certain factors or proportions in the design of the apparatus are important features of this invention. Taking a typical example, where the catalyst mass is composed of granular particles of clay, which may themselves be the catalyst or in and/or on which an active catalytic material such as a metallic oxide is deposited, the following criteria may be used as typical of commercial design. The dimensions of the apparatus and tube spacing should be such that the unit reaction paths defined thereby should be 3 or more feet in length, up to 15 feet or more, and preferably of small minimum transverse dimension, one of the cross-sectional dimensions of the unit path preferably not exceeding 1 to 2 inches. The several ratios stated elsewhere herein should be observed. The maximum distance of any catalyst particle from any heat extraction surface preferably should be about ½ inch, and not more than about 1 inch. The average distance of any catalyst particle from a heat extraction surface is preferably about ¼ inch, and not more than about ½ inch. When fins are used, to insure proper heat transmission, design should be such that $\Delta T$(Fin), the temperature drop from fin tip to fin base, should not be greater than about 25%, and preferably about 10% of $\Delta T$(Total), the temperature drop from contact bed to heat transfer medium. Designed proportions of fins should be such that for any cross-section of fin, "l", the length of the cross-section, divided by "d", the least transverse dimension of fin, (see Figure 3), should not be greater than about 12 and preferably about 4 to 8. That is $1/d$=not greater than 12, and $1/d$=preferably 4 to 8.

The optimum dimensions, ratios; etc., given herein are based particularly upon use of a cylindrical catalyst granule about 2½ mm. in diameter by about 4 mm. average length, or any other shape having a like mass and percentage of void per unit volume of packed catalyst. As the catalyst particle size increases, the ratio of heat extraction surface to unit catalyst volume may decrease and the maximum distance of catalyst particle from heat extraction surface may increase. The same changes may be made with a catalyst mass of greater heat conductivity than that indicated. When the design controlling operation is that of regeneration, a high degree of coking will call for increased heat extraction surface/catalyst volume ratio and decreased maximum distance, and conversely. It will be understood, therefore, that the optimum specific dimensions, ratios; etc., will vary somewhat according to the particular needs of a particular operation. No claim is made herein to any particular composition or physical form of catalyst or contact mass.

Figure 12:
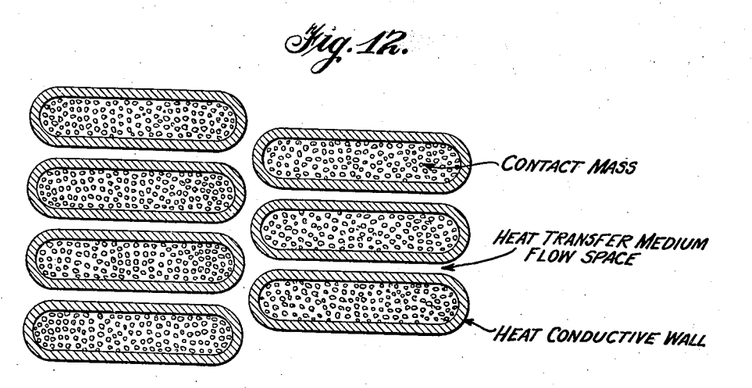
Figures 12 and 13 show an alternative general form of construction.
Figure 13:
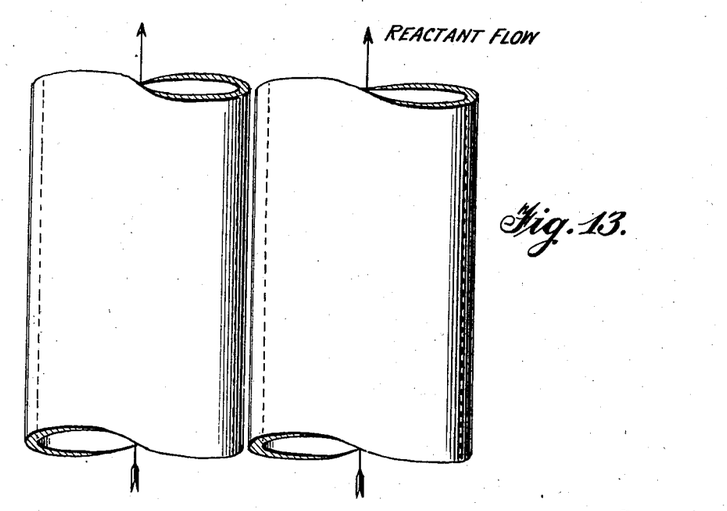

Each design observes certain rules of proportion of parts which are set forth herein, and upon which the unique capability of the process is in large part based. Provided these rules of proportion of parts are followed, the process may also be carried out in apparatus wherein the contact mass is contained in tubular members, properly spaced one from another, and surrounded by positively circulated heat transfer medium. Such apparatus is shown in Figures 12 and 13.

Figure 14:
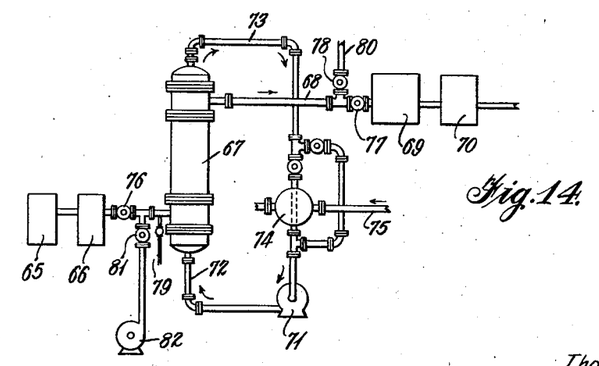
Figure 14 is an illustration of how the apparatus with which this invention is concerned may be set up and operated for commercial practise of the process to be conducted therein.

Figure 14 shows in diagram form an operating setup for the use of a catalytic reaction chamber embodying these features in a reaction process. In Figure 14, 65 indicates a source of supply of reaction material, and 66 indicates apparatus for the preparation of that reaction material which may be a heater, a mixing device, or merely a measuring device or pump embodying whatever features are necessary to present the contemplated material at a proper pressure and temperature, in a proper physical and chemical condition for reaction at the entrance to the reaction chamber 67, which is here shown as being of the type described in Figure 1. Reaction products pass through pipe 68 to purification means 69, which may be any means or setup of apparatus appropriate to the reaction and material under consideration, and from thence to means 70 for the disposal of reaction products. While reaction is taking place a fluid heat exchange medium of physical properties suitable to the reaction temperature is being circulated by pump 71 through pipe 72, through the internal tubes in chambers 67, through pipe 73, and through heat exchanger 74, wherein its temperature may be adjusted to the demands of the reaction by use of a cooling or heating medium introduced through pipe 75. On the completion of reaction, valve 76 may be closed and valve 77 may be closed, isolating the reaction case from reaction material supply and reaction product disposal. Valve 78 may be opened and, if it is necessary or appropriate to purge the contact mass of reaction material, a purging agent may be admitted through pipe 79, and the products of purging disposed of through pipe 80. Then valve 81 may be opened and regenerative medium supplied by pump or blower 82 may be passed through the contact mass within the case 67, the products of regeneration being disposed of through pipe 80. While regeneration is going on the circulation of the heat exchange medium through the circuit provided will be continued, except that the temperature level of the heat exchange medium appropriate for regeneration, which may not be the same and frequently is not the same as the reaction temperature, is adjusted by proper manipulation of exchanger 74 and the by-pass therearound.

The apparatus thus shown is capable of being used for many reactions, such as for example the catalytic treatment of hydrocarbons in vapor or liquid phase, the oxidation of sulphur gases to sulphuric anhydride, the oxidation or partial oxidation of various organic materials, and other reactions of generally similar natures.

As stated above, various relationships and ratios involving such matters as amount of heat transferring surface, volume of heat exchange medium and volume of contact mass are important features of the invention, and have been reasonably well determined by actual operation and experimentation. The following figures represent a preferred relationship which has been found to operate satisfactorily. It will be understood that the figures given refer only to that portion of the apparatus which contains the contact mass and do not include the adjacent zones where tube headers, heat exchange medium manifolds or distribution spaces, and vapor passages exist but which do not contain contact mass. This is also true of the figures stated in the claims.

Volume of catalyst including voids = 71.4
Volume of heat exchange metal (tubes and fins) = 19.6
Volume occupied by molten salt in tubes = 9.0

Total (volume of space occupied by catalyst, salt, and heat exchange surfaces) 100.0
Heat exchange surface per cubic inch of molten salt = 19.7 sq. in.
Heat exchange surface per cubic inch of metal in heat transfer tubes and fins = 9.0 sq. in.
Heat exchange surface per cubic inch of molten salt plus metal = 6.2 sq. in.
Heat exchange surface per cubic inch of catalyst = 2.5 sq. in.

We give the following data to define the preferred range for best design and operation:

Volume of catalyst including voids = 60–80% of space in catalyst zone
Volume of molten salt = 2–15% of space in catalyst zone
Volume of metal (tubes and fins) = 15–30% of space in catalyst zone Volume of catalyst plus salt plus metal = 100.00% of space in catalyst zone Heat exchange surface per cubic inch of molten salt = 15–60 sq. in.
Heat exchange surface per cubic inch of metal in heat transfer tubes and fins = 5–15 sq. in.
Heat exchange surface per cubic inch of molten salt plus metal = 4–12 sq. in.
Heat exchange surface per cubic inch of catalyst = 1.5–6 sq. in.

It will be understood that, while best design and operation in accordance with this invention is obtained by observing the limits and ranges set forth above, a gradual approach to such limits and ranges will naturally begin to produce some of the advantages obtained by the present invention. There is, therefore, a borderline range of relationships which do not yield the results obtainable by practise of the preferred form of the invention but within which some of the advantages of the invention begin to be realized. For the purpose of defining this borderline range we give below figures defining relationships beyond the limits of which operating difficulties would arise which would seriously impair the efficiency of the process or would increase the cost to a most undesirable level as compared with our preferred design and operation.

Volume of catalyst including voids = 40–90% of space in catalyst zone
Volume of molten salt = 1–25% of space in catalyst zone
Volume of metal (tubes and fins) = 5–50% of space in catalyst zone Heat exchange surface per cubic inch of molten salt = 5–100 sq. in.
Heat exchange surface per cubic inch of metal in heat transfer tubes and fins = 3–30 sq. in.
Heat exchange surface per cubic inch of molten salt plus metal = 2–20 sq. in.
Heat exchange surface per cubic inch of catalyst = 0.5–8 sq. in.

These relationships and ratios as herein set forth, define the relationship between the hydraulic radius of the catalyst-containing reaction path, the mass velocity of the critical reactant, and the mass velocity of the heat exchange medium. The design is controlled by the ratio of heat transferred to heat liberated or absorbed in the catalyst. If the heat load per unit time is greater for the regeneration, as in many cases, the regeneration medium may be the critical reactants for design purposes. Under proper conditions, as herein set forth, heat liberation (or demand) may be made substantially uniform per unit volume of catalyst, (at least in the critical zone, although the principles herein set forth tend strongly against the existence of zones of activity higher or lower than the average). Heat transfer also may be made substantially uniform per unit area of heat transfer surface. The proper proportion of catalyst volume to heat transfer surface defining that volume is then shown by $$\frac{\text{Heat liberated per unit time per unit volume}}{\text{Heat transferred per unit time per unit surface}} = HR,$$

wherein HR is a quantity of the nature of a hydraulic radius, having the dimensions of length, and as shown hereinbefore has a broad range of from 1/8" to 2" and a preferred range of from 1/8" to 2/3". The rate of heat liberation or heat demand is a function of the mass velocity of the critical reactant in weight per unit time per unit volume of catalyst. For example, in a regeneration operation, burning carbon from a mass of the nature of clay, it would be that rate which, while not exceeding a temperature of about 1000° F. under conditions of operation, would remove carbon at the rate of from about 1% by weight of catalyst per hour to about 10% per hour, for a board range of possible operation, and from about 3% to about 6% for preferred operation. The mass velocity of heat transfer medium, of course, depends upon the specific heat and other characteristics of the medium. It is best defined as that mass velocity of heat exchange medium which will extract the required amount of heat while undergoing a temperature rise of not greater than about 50° F., and preferably of from 2° to 10° F.

The advantages of this process are particularly apparent when the reaction to be conducted is endothermic, or when it is one which, when uncontrolled, may localize in zones of unduly high activity. In the process herein disclosed particular attention is given to confining the flow of the reaction mixture to contact masses of proper dimensions, eliminating objectionable cross and random flow. Likewise, the use of heat exchange medium (as fused salts, fused alloys, and the like), in the manner shown, permits the circulation of relatively great amounts of heat exchange medium per unit of time (large heat containing capacity) not substantially higher in temperature than the optimum reaction temperature, throughout the catalyst mass to hold the whole length of each path at a uniform temperature, to hold all paths at uniform temperature, and to supply latent heat of reaction as needed.

The method is peculiarly adapted to regeneration in situ of catalyst masses which have been used in processes which deposit carbon and the like on the contact mass. In such cases, the regeneration reaction takes the form of a burning off of carbonaceous residues of a cokey or gummy nature. This reaction is highly exothermic and yet requires a comparatively high ignition temperature. Such reactions are difficult of control. If the heat is not carried away with sufficient rapidity, sintering of catalyst mass with rapid loss of efficiency occurs. If carried away too rapidly or unevenly, regeneration becomes spotty, incomplete, too slow, or may even fail. The use of this invention results in very uniform regeneration because of the means for proper control and the optimum relations above described, as well as because the catalytic reaction having been uniform throughout the mass, the carbonaceous deposits are also substantially uniform. Regeneration may be accomplished far more rapidly because of the easy and positive control of temperature. The ability to use a relatively great amount of circulation of heat exchange medium of high heat containing capacity per unit volume per degree of temperature change permits delicate control of regeneration conditions. The regeneration is made uniform by the ability to maintain uniform conditions throughout the catalyst mass. Of great importance, cold air may be used in regeneration because of the presence of heat storage within the system sufficient to bring it to kindling temperature in a very short time, assisted by rapid circulation of the above-mentioned high heat content medium. Heat withdrawn from the catalyst chamber, since air may be preheated within the chamber, can be rejected at a sufficiently high temperature level to permit of its use for other purposes.

Of real importance in many reactions is the fact that the contact mass may be effectively and rapidly steam purged before and after regeneration by sweeping with steam, the type of path through the catalyst being such that contact of steam and catalyst is positive and assured.

All of these advantages are reflected, in the case of a hydrocarbon conversion process, by such advantages as high yields per unit volume of catalyst and unit volume of charging stock, rapid reaction rates, rapid, uniform, and complete regeneration, quick purging, and low production of undesirable product per unit of charge.

The specific illustrations and optimum numerical data herein given are given largely by way of example, and the invention is not understood to be limited thereby, except as such limitations are stated in the following claims. It is to be understood that the term "catalyst" in the claims is intended to include any contact mass with which fluids are contacted during or for the purpose of a reaction, and the term "catalytic reaction" as used in the claims is intended to mean any such reaction, including regeneration of the catalyst or contact mass.

We claim:

1. A process for controlling the temperature of a body of contact material in a converter chamber in which conduits extend into the contact material for the circulation of heat transfer fluid during a cycle of operation including catalytic conversion of fluid reactants resulting in deposition on the contact material of a contaminating substance which tends to inhibit catalytic activity of the contact material and flowing a regenerating fluid through said body at a controlled temperature; comprising successively passing said fluid reactants and said regenerating fluid through said contact material in the form of a plurality of long thin streams substantially parallel to said conduits and obstructed to a material extent only by the contact material, each of said streams being substantially enclosed by a plurality of heat transfer surfaces extending parallel to said streams in heat conducting relationship with said heat transfer fluid and being in restricted communication with at least one other of said streams through an opening between said surfaces, said streams being sufficiently thin to effect the maintenance of the desired heat control of the contact mass in all portions of each stream by conduction with the heat control fluid through said heat transfer surfaces, and maintaining a heat control fluid in said conduits.

2. A process for controlling the temperature of a body of contact material in a converter chamber in which conduits having longitudinal fins extend into the contact material for the circulation of heat transfer fluid during a cycle of operation including catalytic conversion of fluid reactants resulting in deposition on the contact material of a contaminating substance which tends to inhibit catalytic activity of the contact material and flowing a regenerating fluid through said body at a controlled temperature; comprising successively passing said fluid reactants and said regenerating fluid through said contact material in the form of a plurality of long, thin streams substantially parallel to the planes of said fins and obstructed to a material extent only by the contact material, each of said stream being substantially enclosed by a plurality of heat transfer surfaces constituting the exterior surfaces of said conduits and said fins which are in heat conduction relationship with said heat transfer fluid, each of said streams being in restricted communication with at least one other of said streams through an opening between said surfaces, said streams being sufficiently thin to effect the maintenance of the desired heat control of the contact mass in all portions of each stream by conduction with the heat control fluid through said heat transfer surfaces, and maintaining a heat control fluid in said conduits.

3. The process of claim 1 further characterized in that the periphery of each of said streams is substantially greater than that required to encircle the cross-sectional area thereof.

4. The process of claim 1 further characterized in that said heat control medium is maintained during regeneration at a temperature substantially approaching the lower limit of the temperature within which regeneration will occur.

5. The process of claim 1 further characterized in that said streams are at least approximately three feet in length.

6. The process of claim 2 further characterized in that the periphery of each of said streams is substantially greater than that required to encircle the cross-sectional area thereof.

7. The process of claim 2 further characterized in that said heat control medium is maintained during regeneration at a temperature substantially approaching the lower limit of the temperature within which regeneration will occur.

8. The process of claim 2 further characterized in that said streams are at least approximately three feet in length.

THOMAS P. SIMPSON.
JOHN W. PAYNE.
JOHN A. CROWLEY, Jr.
CLARK S. TEITSWORTH.